(No Model.) 2 Sheets—Sheet 1.
M. KLAUTSCH.
ACCOUCHEMENT APPARATUS FOR INSTRUCTION.
No. 451,675. Patented May 5, 1891.
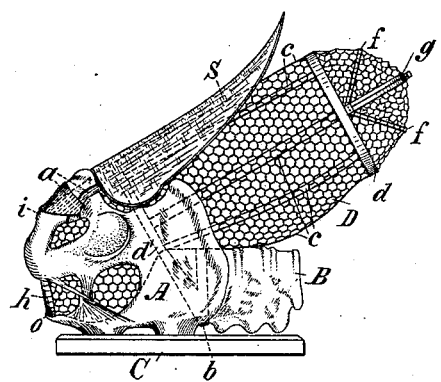
Fig. II.
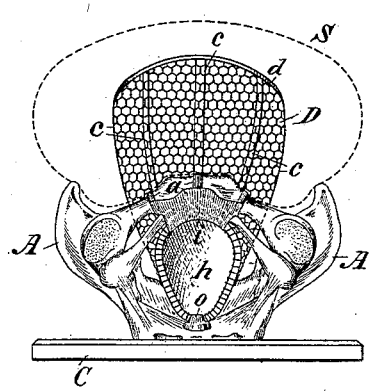
Fig. I.
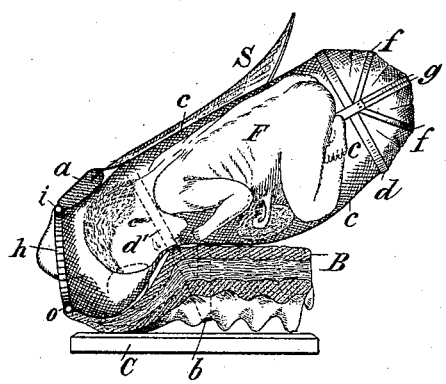
Fig. IV.
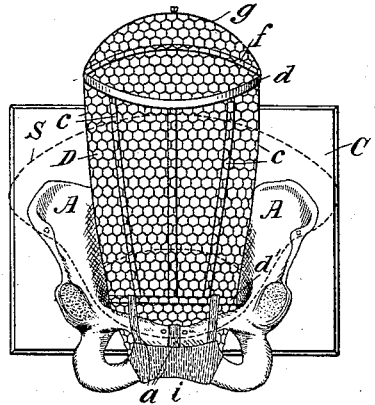
Fig. III.
Witnesses
Henry Orth Jr.
B. W. Sommers
Inventor.
Moritz Klautsch
per
Henry Orth
Atty (No Model.) 2 Sheets—Sheet 2.
M. KLAUTSCH.
ACCOUCHEMENT APPARATUS FOR INSTRUCTION.
No. 451,675. Patented May 5, 1891.
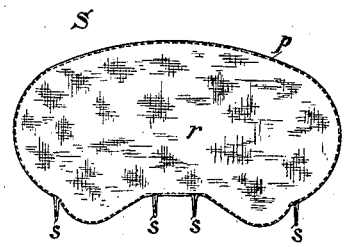
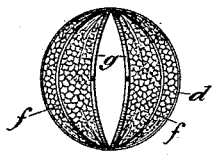
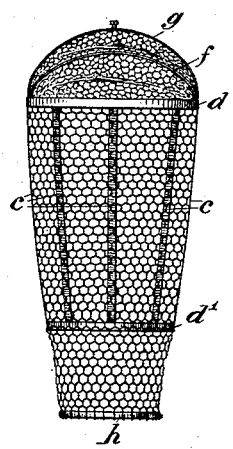
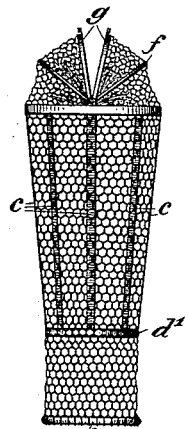
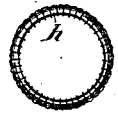

United States Patent Office.

MORITZ KLAUTSCH, OF HALLE-ON-THE-SAALE, GERMANY.

ACCOUCHEMENT APPARATUS FOR INSTRUCTION.

SPECIFICATION forming part of Letters Patent No. 451,675, dated May 5, 1891.

Application filed August 21, 1890. Serial No. 362,583. (No model.)

*To all whom it may concern:*

Be it known that I, MORITZ KLAUTSCH, assistant and inspector of the anatomical collections of the Royal University, of Halle-on-the-Saale, in the Empire of Germany, have invented certain new and useful Improvements in an Accouchement Apparatus for Instructional Purposes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Referring to the drawings, Figure I is a front view. Fig. II is a side elevation. Fig. III is a top plan view, and Fig. IV is a longitudinal sectional view, of an obstetrical device or apparatus for educational purposes embodying my invention. Fig. V is a side elevation. Fig. VI is a top plan view, and Figs. VII and VIII opposite end views, of that portion of the apparatus representing the womb or uterus. Fig. IX is a face view of that portion of the apparatus representing the lower part of the abdomen.

This invention relates to surgical or clinical apparatus for teaching obstetrics or that part of the clinic relating to accouchement or childbirth.

The invention comprises and has for its object to provide a transparent uterus, so that the manipulation of the fetus by the demonstrator may be viewed by the student or pupil, and to combine with the transparent uterus a shield so arranged relatively to the uterus that the operator cannot see his hands while the demonstrator has a full view of them.

My invention comprises also minor improvements, such as the construction of the uterus and its combination with the pelvic bones and the vagina, and the combination with the uterus of a hood or cover, as will now be fully described.

To these ends the invention consists in the construction of the apparatus and in the parts thereof, and in the combination of said parts as will now be fully described, reference being had to the above-described figures of drawings, in which—

C indicates a suitable support for the apparatus—as a board, for instance—and A indicates the bones of the pelvis, such as the os sacrum, the os coccygis, and the os innominata, together with a portion of the lumbar vertebral column B, which may be made of plaster-of-paris, papier-maché, or any other material usually employed for such purposes and arranged on the board in a position corresponding to that usually assumed by the patient, or which such patient may be required to assume, to which end the pelvis portion may be arranged so as to be turned on the support C, so that the parts may be made to illustrate the side position.

D indicates the uterus, and in its form is as nearly as possible that of the natural uterus during pregnancy. The uterus is constructed of a transparent material or fabric and preferably of an open-mesh netting, as shown, which is stretched upon a flexible frame composed of a number (three or four or more) of longitudinal strips or bands of steel $c$, or of steel wire, or spirally-wound steel springs secured to two rings or bands of steel $d$ and $d'$, respectively, one end of the uterus being closed by a hood composed of two sections $f$ and $g$, hinged together on pintles secured to the ring $d$, and provided with a lock $g$.

That part of the uterus intended to represent the vagina $v$ is fitted with an elastic ring $h$, which is secured to the os pubis at $i$ and to the os coccygis at $o$, and represents the mouth of the vagina.

The vaginal portion $v$ of the uterus—namely, that portion between the rings or bands $d'$ and $h'$—may, if desired, be made of non-transparent material, and the mouth of the vagina, instead of being cylindrical, may be made more or less elliptical or ellipsoidal or flattened, so as to more nearly conform to the mouth of the natural vagina. The uterus is further secured to the pelvis bones by means of a strap or straps $b$, as shown in dotted lines in Figs. 2 and 4, to hold the same in proper relation to said bones.

The hinged hood $f$ $g$, as will be readily understood, serves for the introduction into the uterus of the fetus or child.

S is a shield in imitation of the lower part of the abdomen and provided with dowels $s$, that fit into sockets formed in the os pubis and the pelvis bones for the purpose of covering the uterus, so that the operator may not see his hands during the manipulation of the fetus or child, while the demonstrator standing on one side of the apparatus or the other has a full view of the position of the hands of the operator, and can thus give the necessary directions. The screen or shield S is simply a wire frame covered with any suitable non-transparent fabric, and is preferably made detachable, so that during demonstration the pupil may have a full view of the demonstrator's hands.

By means of the described apparatus the various conditions that arise or may arise in childbirth can be demonstrated. The demonstrator can place the fetus or child in any of the various positions in which it is or may be found in the uterus, while it is also possible to demonstrate the different positions of the uterus relatively to the pelvis and its actions or movements.

The child or fetus F consists, for the purposes in view, of a figure made of leather and of a certain pliability or flexibility, in order to adapt it for manipulation as nearly as possible as a natural child or fetus, and is provided with the umbilical cord, which is connected with the placenta, in order that the entire operation of child birth or accouchement may be clearly demonstrated.

Of course instead of the fetus or child above referred to, a natural fetus or child preserved in alcohol may be used for the purposes of demonstration.

As to the fabric or material of which the uterus is constructed, I do not desire to limit myself to a net-like fabric. Any other fabric or material, provided it is pliant or flexible and transparent, will answer the same purpose.

Having thus described my invention, what I claim, and desire to secure by Letters Patent, is—

1. In an apparatus of the class described, the uterus constructed of a transparent material, substantially as and for the purposes specified.

2. In an apparatus of the class described, the uterus constructed of a transparent material, in combination with a hinged hood at one end, substantially as and for the purpose set forth.

3. In an apparatus of the class described, the uterus constructed of a transparent material and provided at one end with a contracted extension representing the vagina, said vagina having a contractible mouth, substantially as and for the purposes set forth.

4. In an apparatus of the class described, the combination, with the os pubis and the pelvic bones, of a uterus constructed of a transparent material and provided with an extension representing the vagina connected with the os pubis and the os coccygis, substantially as and for the purpose set forth.

5. In an apparatus of the class described, the uterus consisting, essentially, of a pliable frame-work and a transparent fabric secured thereto, substantially as and for the purpose set forth.

6. In an apparatus of the class described, the combination, with the uterus constructed of a transparent material and provided with an extension representing the vagina, of a shield S, arranged in rear of the vaginal portion, so as to cover the uterus, substantially as and for the purpose set forth.

7. In an apparatus of the class described, the combination, with the uterus D, constructed substantially as set forth, of the pelvic bones and the os pubis, to which the uterus is secured, and a shield S, detachably connected with said pelvic bones and the os pubis, substantially as and for the purpose set forth.

In testimony whereof I affix my signature in presence of two witnesses.

MORITZ KLAUTSCH.

Witnesses:
CARL BORNGRAEBER,
GUSTAV NAUCK.